United States Patent
Bhukania

(10) Patent No.: US 9,888,525 B2
(45) Date of Patent: Feb. 6, 2018

(54) DUAL BAND WIRELESS LOCAL AREA NETWORK (WLAN) TRANSCEIVER

(71) Applicant: BROADCOM CORPORATION, Irvine, CA (US)

(72) Inventor: Bijoy Bhukania, Bangalore (IN)

(73) Assignee: AVAGO TECHNOLOGIES GENERAL IP (SINGAPORE) PTE. LTD, Singapore (SG)

(*) Notice: Subject to any disclaimer, the term of this patent is extended or adjusted under 35 U.S.C. 154(b) by 68 days.

(21) Appl. No.: 14/697,753

(22) Filed: Apr. 28, 2015

(65) Prior Publication Data

US 2015/0237676 A1    Aug. 20, 2015

Related U.S. Application Data

(63) Continuation of application No. 13/075,721, filed on Mar. 30, 2011, now Pat. No. 9,031,048.

(51) Int. Cl.
*H04W 88/10* (2009.01)
*H04L 5/16* (2006.01)
*H04W 84/12* (2009.01)

(52) U.S. Cl.
CPC .............. *H04W 88/10* (2013.01); *H04L 5/16* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2003/0224747 | A1* | 12/2003 | Anand | H03L 7/0891 455/208 |
| 2008/0207143 | A1* | 8/2008 | Skarby | H04B 1/0475 455/103 |
| 2008/0220788 | A1* | 9/2008 | Stanwood | H04L 5/0007 455/450 |
| 2010/0210221 | A1* | 8/2010 | Takano | H04B 7/0617 455/68 |

* cited by examiner

*Primary Examiner* — Alex Skripnikov
*Assistant Examiner* — Pamit Kaur
(74) *Attorney, Agent, or Firm* — Garlick & Markison; Shayne X. Short

(57) ABSTRACT

Dual band wireless local area network (WLAN) transceiver. A wireless communication device includes at least two different transceivers (or radios) therein to effectuate communications with other wireless communication devices using at least two respective frequency bands. Each of these two transceivers may have different respective circuitry (e.g., each may have a different respective power amplifier (PA) and/or other circuitry components). Coordination is made regarding when certain components of one transceiver turn on and operate when another transceiver may be transmitting or receiving communications. For example, the turn on of a PA and/or other circuitry components (e.g., such as components using or requiring high current) within one transceiver can be coordinated as to minimize deleterious effects regarding the operation of another transceiver. Moreover, latency existent within each of the respective transceiver chains within the wireless communication device (e.g., including baseband and radio portions) is accounted for regarding their respective concurrent operation.

20 Claims, 16 Drawing Sheets

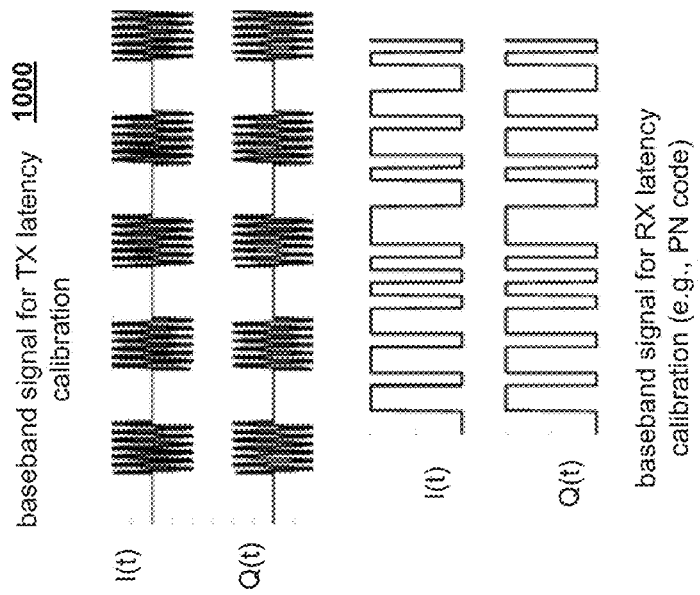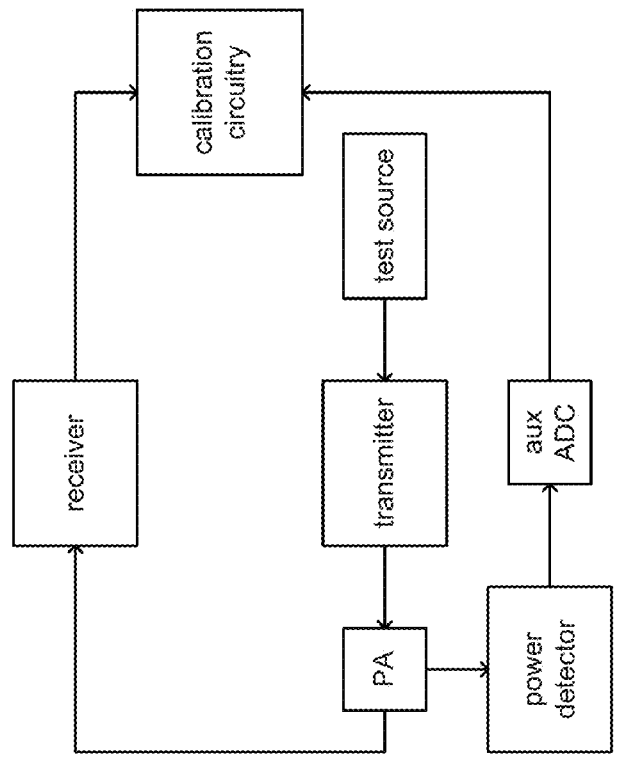
FIG. 10

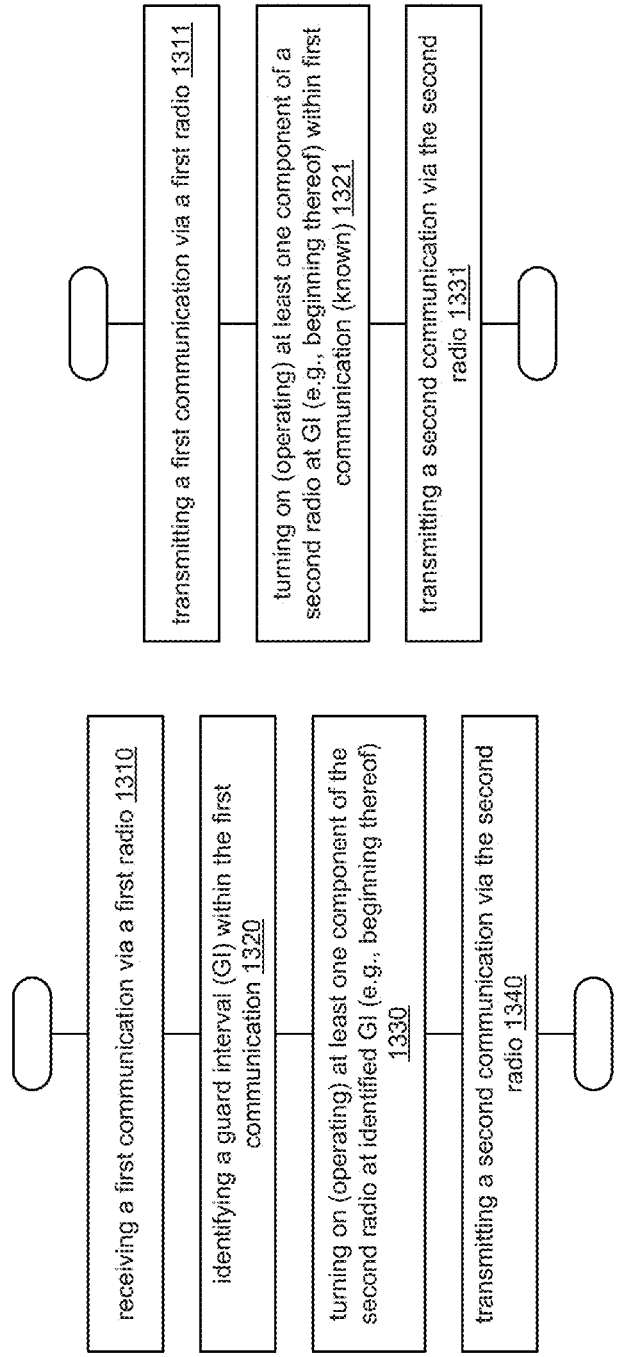

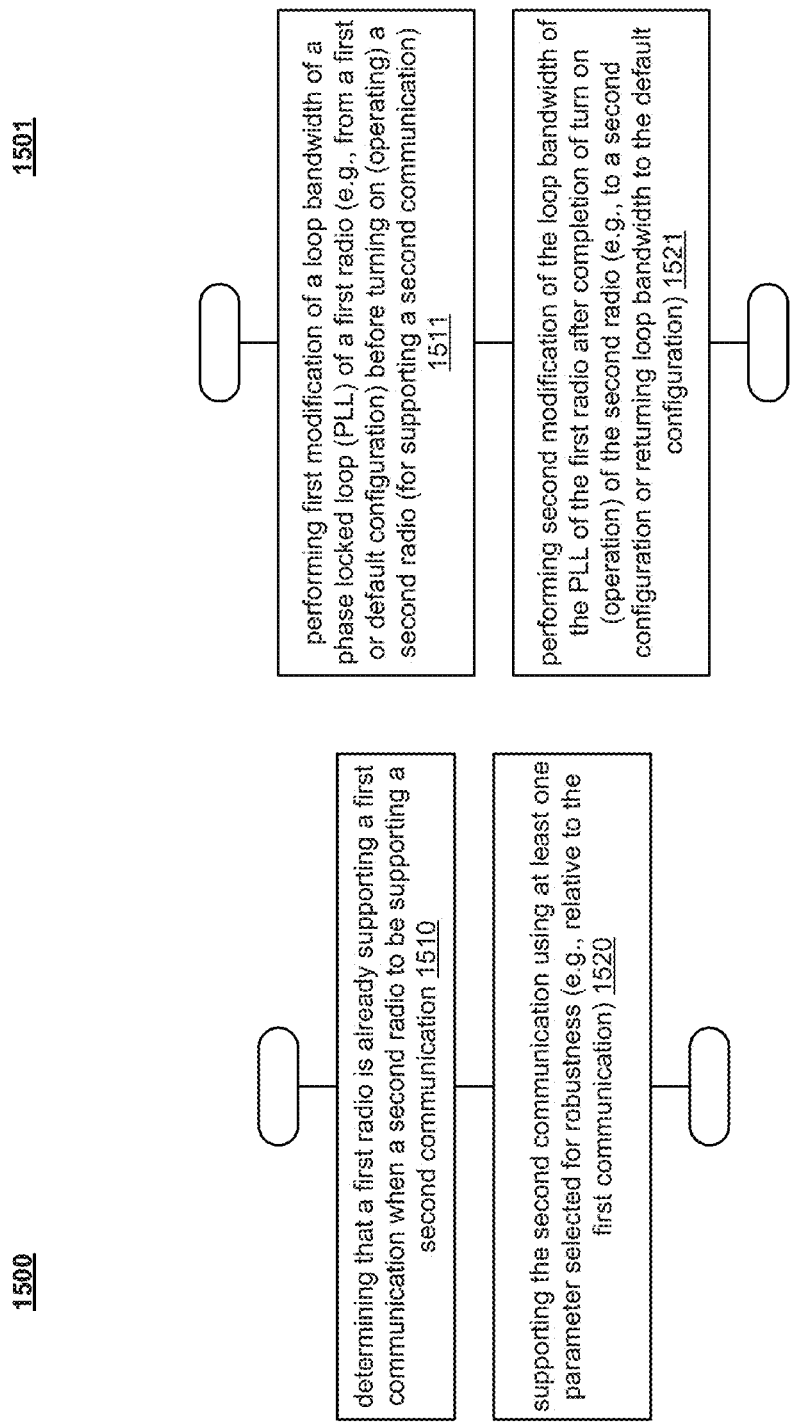

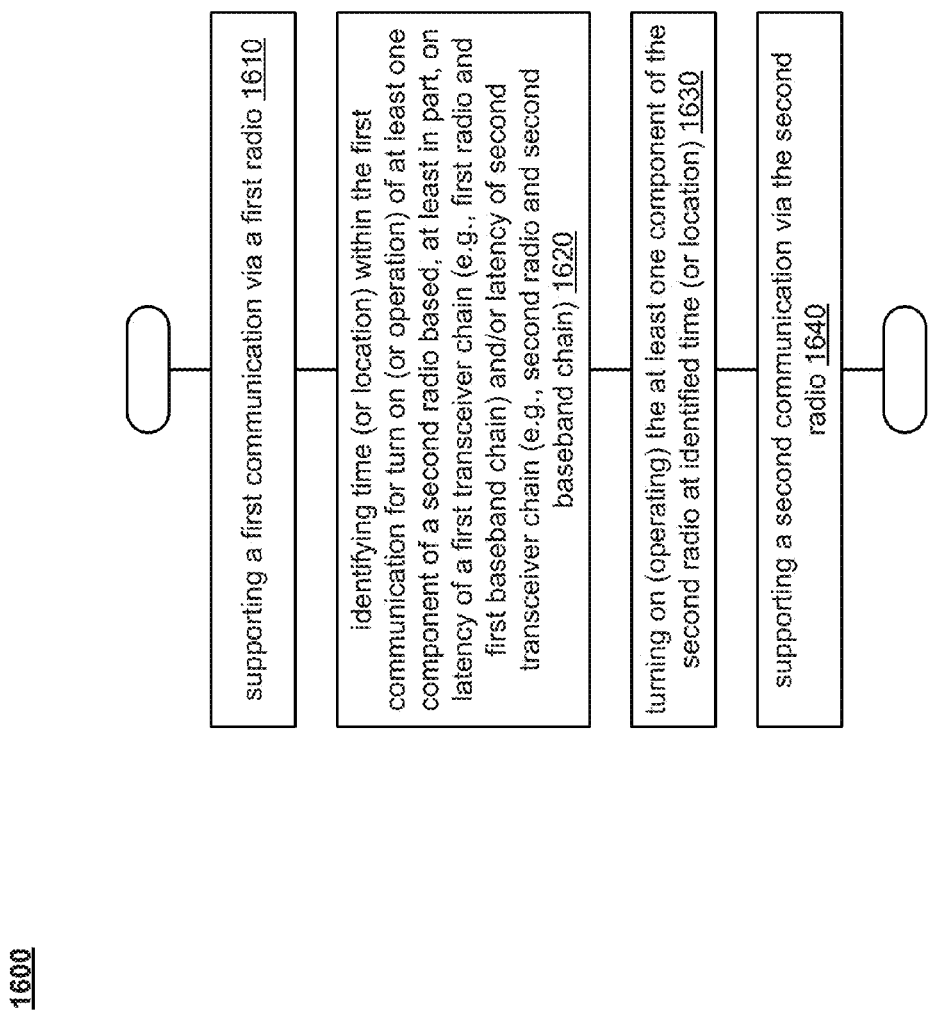

DUAL BAND WIRELESS LOCAL AREA NETWORK (WLAN) TRANSCEIVER

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 13/075,721 entitled "Dual band wireless local area network (WLAN) transceiver," filed Mar. 30, 2011, pending, and scheduled subsequently to be issued as U.S. Pat. No. 9,031,048 on May 12, 2015 (as indicated in an ISSUE NOTIFICATION mailed from the USPTO on Apr. 4, 2015), which is hereby incorporated herein by reference in its entirety and made part of the present U.S. Utility Patent Application for all purposes.

INCORPORATION BY REFERENCE

The following IEEE standards/draft IEEE standards are hereby incorporated herein by reference in their entirety and are made part of the present U.S. Utility Patent Application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11—1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D0.2, March 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 193 pages.

BACKGROUND OF THE INVENTION

Technical Field of the Invention

The invention relates generally to communication systems; and, more particularly, it relates to communication devices including at least two transceivers or radios for supporting simultaneous communications within such communication systems.

Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier (PA). The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), and particularly within communication devices that may employ multiple communication paths therein, the present art does not provide an adequate solution by which various communications maybe performed and operated in a communication device without deleterious affecting one another.

BRIEF DESCRIPTION OF THE SEVERAL VIEWS OF THE DRAWINGS

FIG. 10 illustrates an embodiment of latency estimation within a wireless communication device.

FIG. 12A, FIG. 12B, FIG. 13A, FIG. 13B, FIG. 14A, FIG. 14B, FIG. 15A, FIG. 15B, and FIG. 16 illustrate various embodiments of methods for operating a wireless communication device.

DETAILED DESCRIPTION OF THE INVENTION

Figure 1:
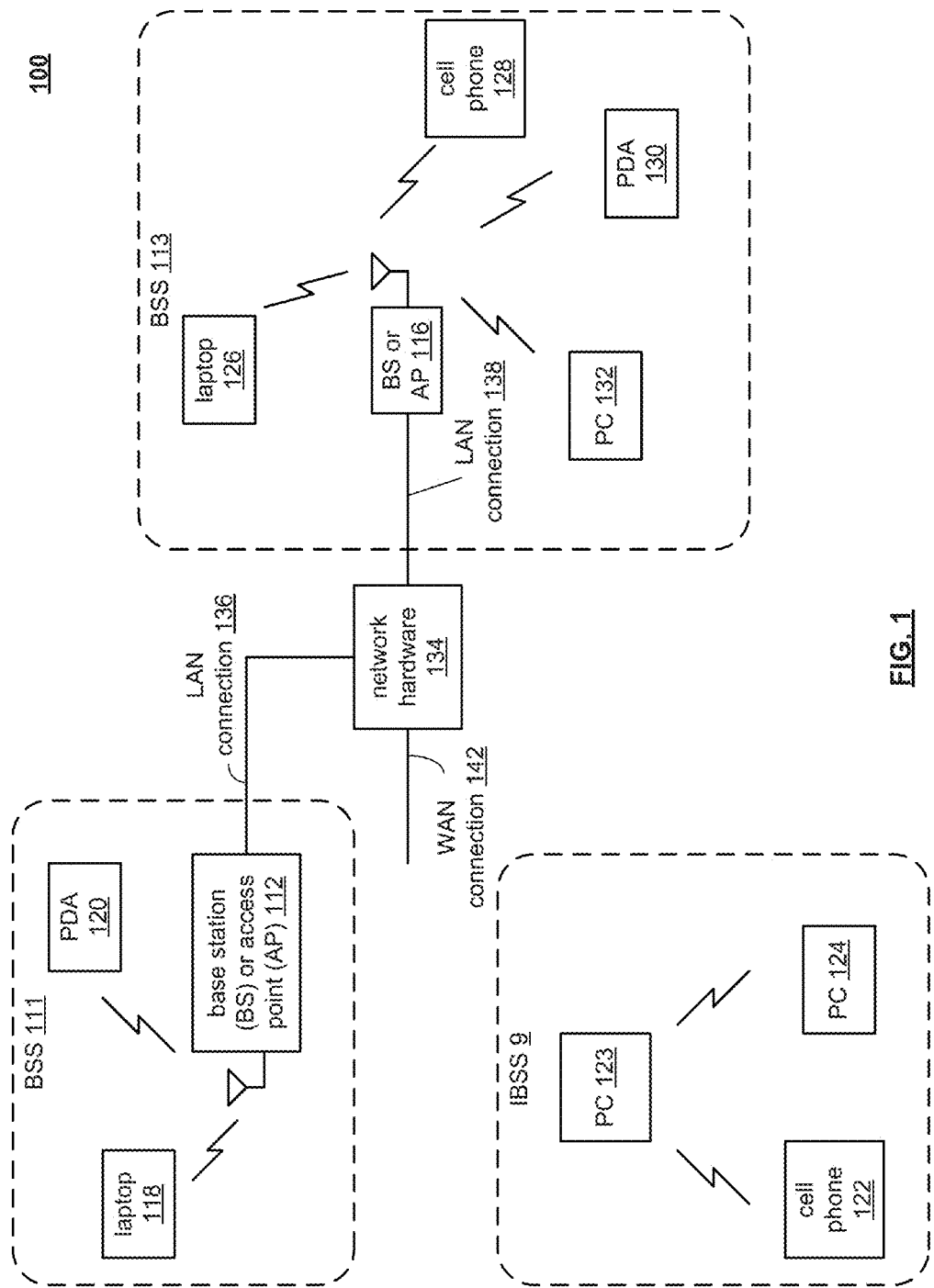
FIG. 1 is a diagram illustrating an embodiment of a wireless communication system.

A novel architecture of a wireless communication device is presented herein in which a wireless communication device includes at least two transceivers or radios for supporting simultaneous communications within such communication systems. In accordance with such a wireless communication device that includes functionality and/or capability for effectuating simultaneous communications, appropriate coordination is made so that the operations within one such transceiver or radio does not deleteriously affect the operation of the other transceiver or radio. For example, in one embodiment, such a wireless communication device can perform simultaneous transmission of at least two separate and distinct communications via each of the respective at least two transceivers or radios. In another embodiment, a wireless communication device can perform simultaneous transmission of at least one communication via at least one of the respective at least two transceivers or radios and reception of at least one communication via at least one other of the respective at least two transceivers or radios.

Certain aspects and principles of the invention relate to a dual band wireless communication device (e.g., in which each respective band is employed for different respective communications). For illustration to the reader, many embodiments described herein are made with reference to a wireless communication device that includes two transceivers or radios. However, it is of course noted that a wireless communication device may alternatively be implemented with more than two transceivers or radios without departing from the scope and spirit of the invention. The principles and aspects made herein may also be employed to ensure appropriate coordination and operation among more than two transceivers or radios.

With respect to an exemplary embodiment including two radios, when one of the radios is receiving a first communication (e.g., such as a first packet), the other radio may initiate a transmission of another communication (e.g., such as a second packet). Each of these respective communications (e.g., the first packet and second packet) may be made with respect to a common other wireless communication device, or these communications may be made alternatively be made to two separate and distinct wireless communication devices (e.g., first packet corresponding to one other wireless communication device, and the second packet corresponding to another other wireless communication device).

Considering the example in which a radio 1 within the wireless communication device is receiving a first communication (e.g., such as a first packet), the another radio 2 within the wireless communication device may initiate transmission of another communication (e.g., such as a second packet), certain components within the radio 2 (e.g., a power amplifier (PA), and/or any other component such as those that draw relatively high amounts of current) may undesirably cause frequency jumps in one or more components within radio 1. In particular, some components within radio 1 may be relatively more susceptible to be deleteriously affected by such operations being performed within the radio 2 (e.g., the turn on of a PA and/or any other component such as those drawing high current). One such example of a component in radio 1 that may be deleteriously affected by turn on or operation of certain components in radio 2 is a voltage controlled oscillator (VCO) in radio 1. For example, the turn on of a PA in radio 2 (and/or other high current drawing component therein) may unfortunately result in a "frequency spike" in the carrier in radio 1. As the radio 1 operates, this frequency spike may unfortunately result in a communication (e.g., packet) being decoded incorrectly within the radio 1 because of carrier phase errors therein. Even when a means for performing phase error correction is employed in radio 1, the frequency spike (caused by components in radio 2) can sometimes cause an effect that is too large to be handled by such phase error correction means.

Analogously, considering an example in which a radio 1 within the wireless communication device is transmitting a first communication (e.g., such as a first packet), the radio 2 within the wireless communication device may initiate transmission of another communication (e.g., such as a second packet), certain components within the radio 2 (e.g., PA, and/or any other component such as those that draw relatively high amounts of current) may undesirably cause frequency jumps in one or more components within radio 1. This is analogous to the simultaneously reception/transmission embodiment described above at least with respect to the deleterious effects that may be incurred. However, the receiving wireless communication device that is receiving the first communication from the wireless communication device (e.g., that communication sent via radio 1) may also suffer performance degradation. For example, this $3^{rd}$ receiving wireless communication device to which radio 1 is transmitting may have a problem decoding the packet that it received because of degradation of it within the radio 1. This can lead to, among other problems, potential inter-operability problems between various wireless communication devices within a communication system.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, etc., provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
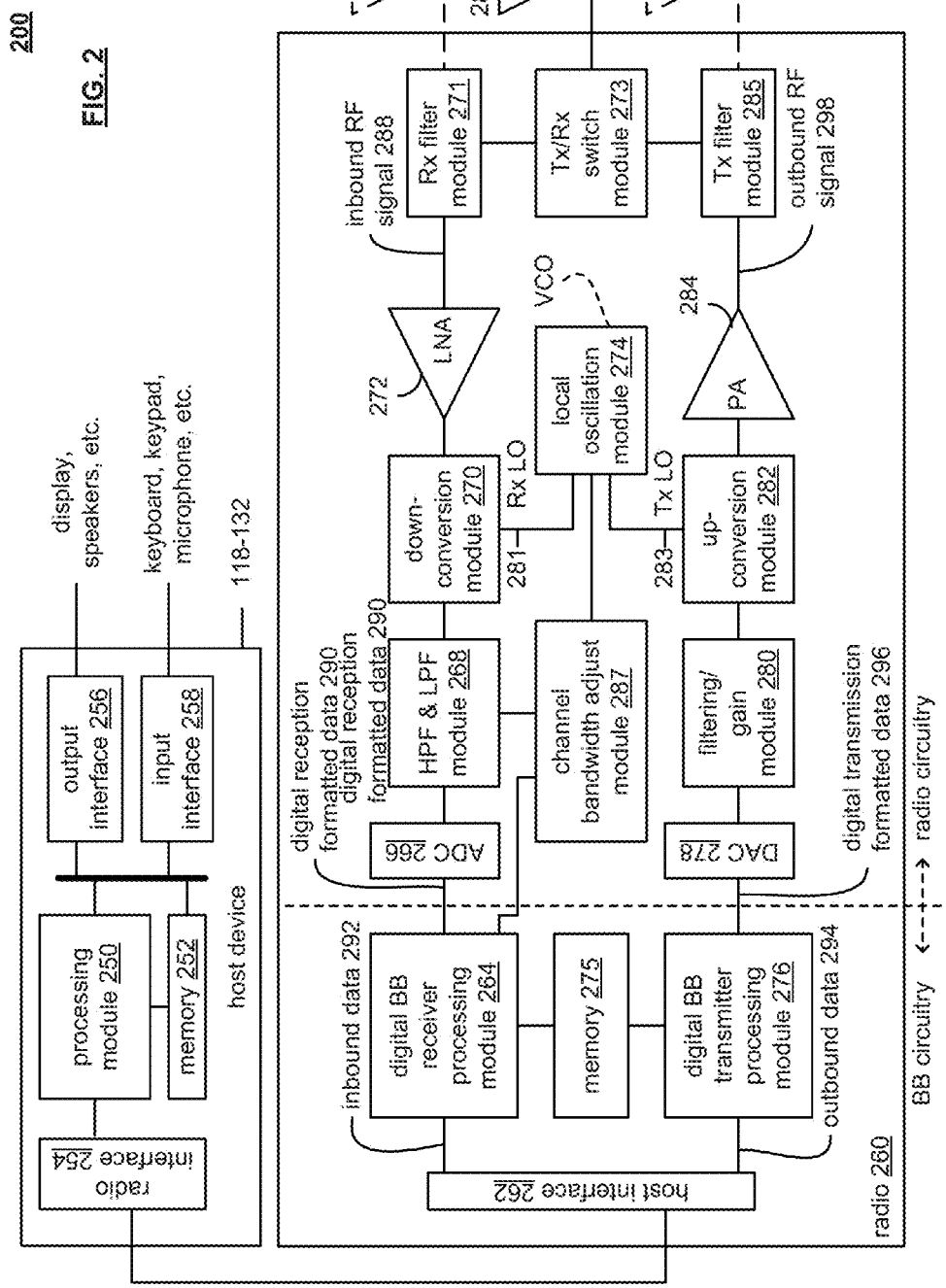
FIG. 2 is a diagram illustrating an embodiment of a wireless communication device.

FIG. 2 is a diagram illustrating an embodiment 200 of a wireless communication device that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, etc., such that the received data may be displayed. The radio interface 254 also provides data from the processing module 250 to the radio 260. The processing module 250 may receive the outbound data from an input device such as a keyboard, keypad, microphone, etc., via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274 (which may be implemented, at least in part, using a voltage controlled oscillator (VCO)), memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, Zig-Bee, WiMAX (Worldwide Interoperability for Microwave Access), any other type of radio frequency based network protocol and/or variations thereof etc.) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device of the embodiment 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, 802.11g, 802.11n, 802.11ac, etc.), a Bluetooth protocol, or any other predetermined means by which wireless communication may be effectuated.

Figure 3:
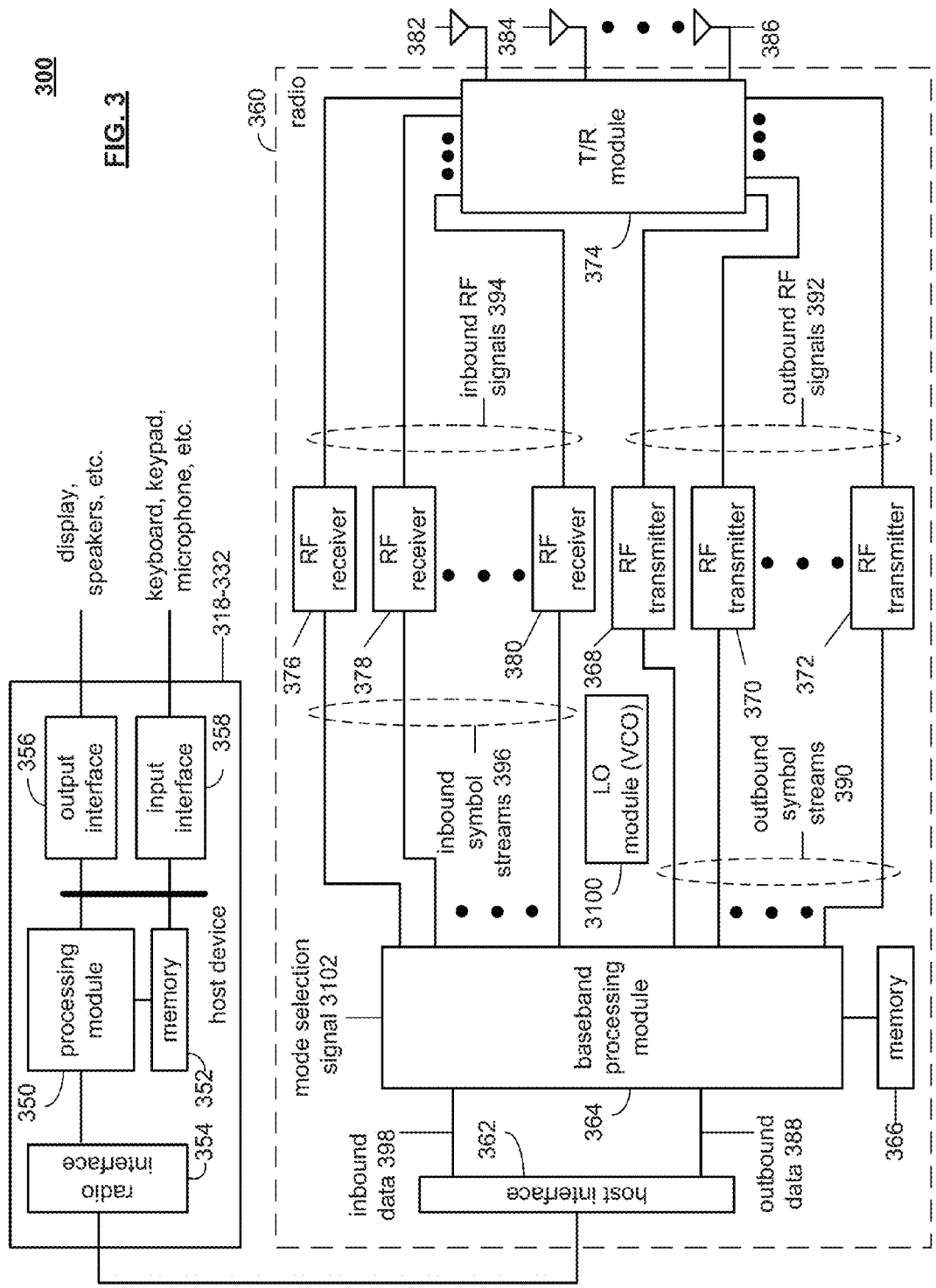
FIG. 3 is a diagram illustrating an alternative embodiment of a wireless communication device.

FIG. 3 is a diagram illustrating an alternative embodiment of a wireless communication device 300 that includes the host device 318-332 and an associated at least one radio 360. For cellular telephone hosts, the radio 360 is a built-in component. For personal digital assistants hosts, laptop hosts, and/or personal computer hosts, the radio 360 may be built-in or an externally coupled component. For access points or base stations, the components are typically housed in a single structure.

As illustrated, the host device 318-332 includes a processing module 350, memory 352, radio interface 354, input interface 358 and output interface 356. The processing module 350 and memory 352 execute the corresponding instructions that are typically done by the host device. For example, for a cellular telephone host device, the processing module 350 performs the corresponding communication functions in accordance with a particular cellular telephone standard.

The radio interface 354 allows data to be received from and sent to the radio 360. For data received from the radio 360 (e.g., inbound data), the radio interface 354 provides the data to the processing module 350 for further processing and/or routing to the output interface 356. The output interface 356 provides connectivity to an output display device such as a display, monitor, speakers, et cetera such that the received data may be displayed. The radio interface 354 also provides data from the processing module 350 to the radio 360. The processing module 350 may receive the outbound data from an input device such as a keyboard, keypad, microphone, et cetera via the input interface 358 or generate the data itself. For data received via the input interface 358, the processing module 350 may perform a corresponding host function on the data and/or route it to the radio 360 via the radio interface 354.

Radio 360 includes a host interface 362, a baseband processing module 364, memory 366, a plurality of radio frequency (RF) transmitters 368-372, a transmit/receive (T/R) module 374, a plurality of antennae 382-386, a plurality of RF receivers 376-380, and a local oscillation module 3100 (which may be implemented, at least in part, using a VCO). The baseband processing module 64, in combination with operational instructions stored in memory 366, execute digital receiver functions and digital transmitter functions, respectively. The digital receiver functions, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, include, but are not limited to, scrambling, encoding, interleaving, constellation mapping, modulation, inverse fast Fourier transform, cyclic prefix addition, space and time encoding, and/or digital baseband to IF conversion. The baseband processing modules 364 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 366 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 364 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 360 receives outbound data 388 from the host device via the host interface 362. The baseband processing module 364 receives the outbound data 388 and, based on a mode selection signal 3102, produces one or more outbound symbol streams 390. The mode selection signal 3102 will indicate a particular mode as are illustrated in the mode selection tables, which appear at the end of the detailed discussion. Such operation as described herein is exemplary with respect to at least one possible embodiment, and it is of course noted that the various aspects and principles, and their equivalents, of the invention may be extended to other embodiments without departing from the scope and spirit of the invention.

For example, the mode selection signal 3102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 3102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 3102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 364, based on the mode selection signal 3102 produces the one or more outbound symbol streams 390 from the output data 388. For example, if the mode selection signal 3102 indicates that a single transmit antenna is being utilized for the particular mode that has been selected, the baseband processing module 364 will produce a single outbound symbol stream 390. Alternatively, if the mode select signal indicates 2, 3 or 4 antennae, the baseband processing module 364 will produce 2, 3 or 4 outbound symbol streams 390 corresponding to the number of antennae from the output data 388.

Depending on the number of outbound streams 390 produced by the baseband module 364, a corresponding number of the RF transmitters 368-372 will be enabled to convert the outbound symbol streams 390 into outbound RF signals 392. The transmit/receive module 374 receives the outbound RF signals 392 and provides each outbound RF signal to a corresponding antenna 382-386.

When the radio 360 is in the receive mode, the transmit/receive module 374 receives one or more inbound RF signals via the antennae 382-386. The T/R module 374 provides the inbound RF signals 394 to one or more RF receivers 376-380. The RF receiver 376-380 converts the inbound RF signals 394 into a corresponding number of inbound symbol streams 396. The number of inbound symbol streams 396 will correspond to the particular mode in which the data was received (recall that the mode may be any one of the modes illustrated in tables 1-12). The baseband processing module 364 receives the inbound symbol streams 396 and converts them into inbound data 398, which is provided to the host device 318-332 via the host interface 362.

In one embodiment of radio 360 it includes a transmitter and a receiver. The transmitter may include a MAC module, a PLCP module, and a PMD module. The Medium Access Control (MAC) module, which may be implemented with the processing module 364, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 364, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 364, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

It is also noted that the wireless communication device of this diagram, as well as others described herein, may be implemented using one or more integrated circuits. For example, the host device may be implemented on one integrated circuit, the baseband processing module 364 and memory 366 may be implemented on a second integrated circuit, and the remaining components of the radio 360, less the antennae 382-386, may be implemented on a third integrated circuit. As an alternate example, the radio 360 may be implemented on a single integrated circuit. As yet another example, the processing module 350 of the host device and the baseband processing module 364 may be a common processing device implemented on a single integrated circuit. Further, the memory 352 and memory 366 may be implemented on a single integrated circuit and/or on the same integrated circuit as the common processing modules of processing module 350 and the baseband processing module 364.

The previous diagrams and their associated written description illustrate some possible embodiments by which a wireless communication device may be constructed and implemented. In some embodiments, more than one radio (e.g., such as multiple instantiations of the radio 260, the radio 360, a combination thereof, or even another implementation of a radio) is implemented within a wireless communication device. For example, a single wireless communication device can include multiple radios therein to effectuate simultaneous transmission of two or more signals. Also, multiple radios within a wireless communication device can effectuate simultaneous reception of two or more signals, or transmission of one or more signals at the same time as reception of one or more other signals (e.g., simultaneous transmission/reception).

Figure 4:
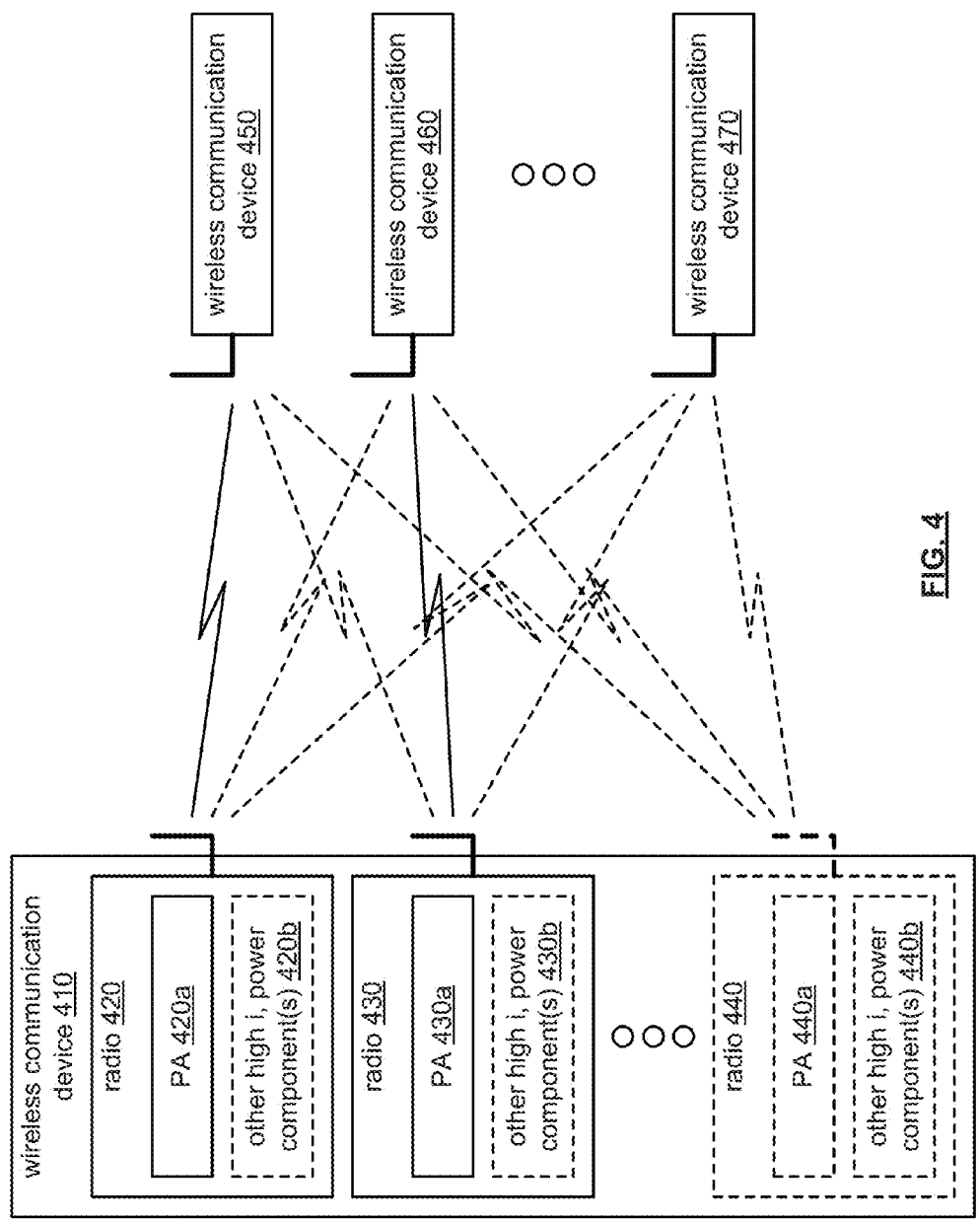
FIG. 4 is a diagram illustrating an embodiment of a wireless communication device including multiple transceivers (or radios) therein.

FIG. 4 is a diagram illustrating an embodiment 400 of a wireless communication device including multiple transceivers (or radios) therein. This diagram shows a wireless communication device 410 as being operative to support communications with various other wireless communication devices such as wireless communication devices 450, 460, and so on up to 460. The wireless communication device 410 includes at least two radios 420 and 430. In some embodiments, the wireless communication device 410 includes more than two radios (e.g., respective radios 420, 430, and so on up to 440). Each respective radio includes a respective power amplifier (PA). For example, radio 420 includes a PA 420*a*, and radio 430 includes a PA 430*a*. In embodiments including more than two radios, radio 440 includes a PA 440*a*. Also, each of the respective radios may also include other high current drawing and/or high power components therein (e.g., 420*b* in radio 420, 430*b* in radio 430, etc.).

As may be understood, when the PA and/or other components within one of the radios of the wireless communication device 410 turns on or operates, that may introduce undesirable effects within another of the radios within wireless communication device 410. As also shown in the diagram, the respective communications associated with each of the various radios in the wireless communication device 410 may be directed to different other wireless communication devices among the wireless communication devices 450-470. Of course, in some other embodiments, a given other wireless communication device includes capability also to support communications using multiple radios therein (e.g., to support simultaneous RX-TX or TX-TX), and in such a case, the other wireless communication device may also support simultaneous communications with the wireless communication device 410.

Figure 5:
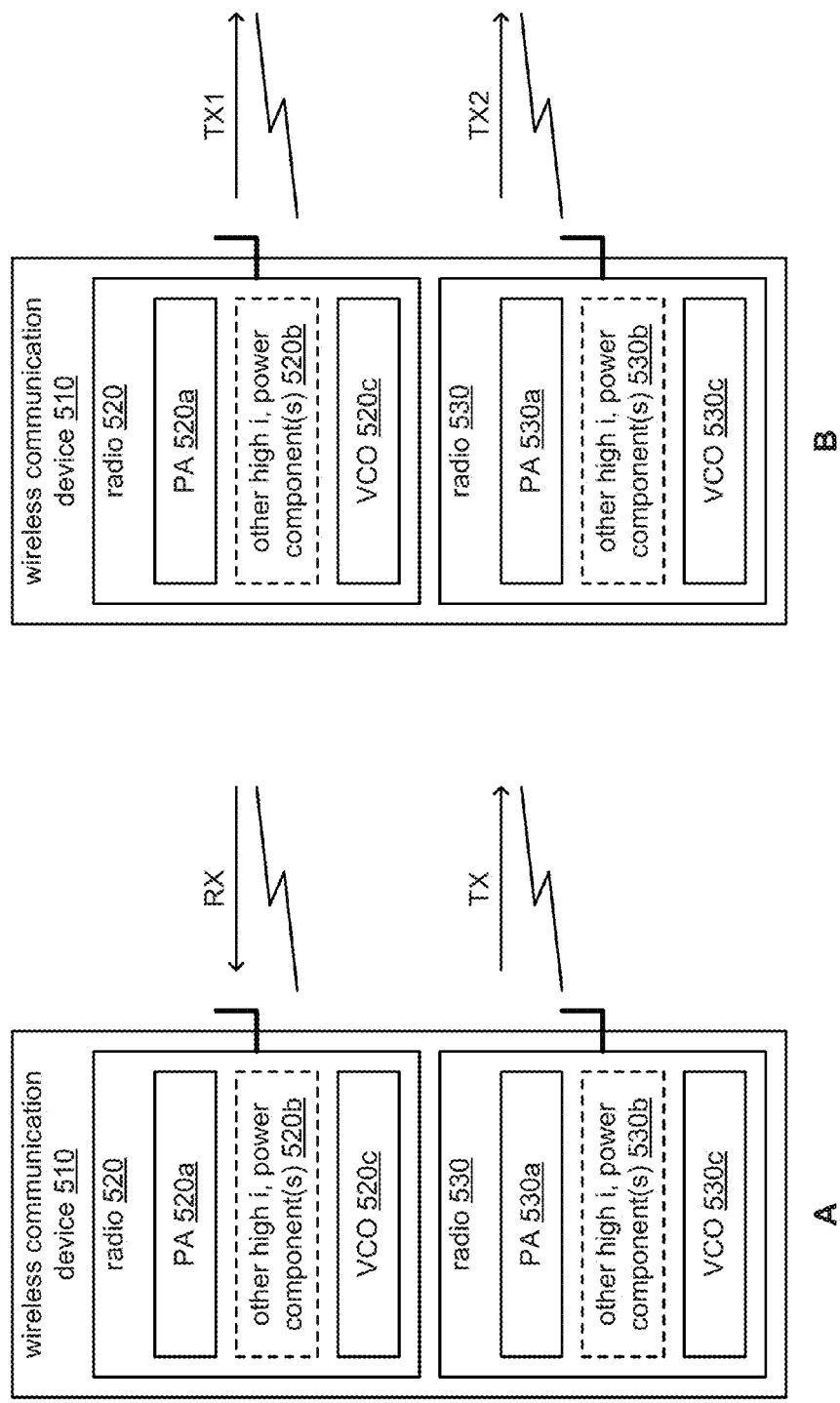
FIG. 5 is a diagram illustrating an embodiment of a wireless communication device performing transmitting of a first signal while receiving a second signal or simultaneous transmitting of respective signals using multiple transceivers (or radios).

FIG. 5 is a diagram illustrating an embodiment 500 of a wireless communication device performing transmitting of a first signal while receiving a second signal or simultaneous transmitting of respective signals using multiple transceivers (or radios). This diagram shows pictorially an embodiment in which a wireless communication device 510 is operative to support communications with various other wireless communication devices includes two radios therein, 520 and 530. Each respective radio 520 and 530 includes a respective PA 520*a* and 530*a*, and each of the respective radios may also include other high current drawing and/or high power components therein (e.g., 520*b* in radio 520, 530*b* in radio 530). Also, as pictorially shown in this diagram, each respective radio 520 and 530 includes a respective VCO 520*c* and 530*c*. Of course, radios within other embodiments of a wireless communication device such as those of FIG. 4 may also include a respective VCO therein.

As shown by the reference numerals A and B, the wireless communication device 510 is operative to support simultaneous RX-TX (reference numeral A) in which radio 520 within the wireless communication device 510 is receiving a first communication (e.g., such as a first packet), the other radio 530 within the wireless communication device is transmitting a second communication (e.g., a second packet).

The wireless communication device 510 is also operative to support simultaneous TX-TX (reference numeral B) in which radio 520 within the wireless communication device 510 is transmitting a first communication (e.g., such as a first packet), the other radio 530 within the wireless communication device is transmitting a second communication (e.g., a second packet).

When such simultaneous operation and support of respective communications are made, the turn on and/or operation of components within one of the radios may deleteriously affect operation within the other radio. For example, the VCO of one radio may be deleteriously affected by the turn on and operation of a PA in the other radio.

Figure 6:
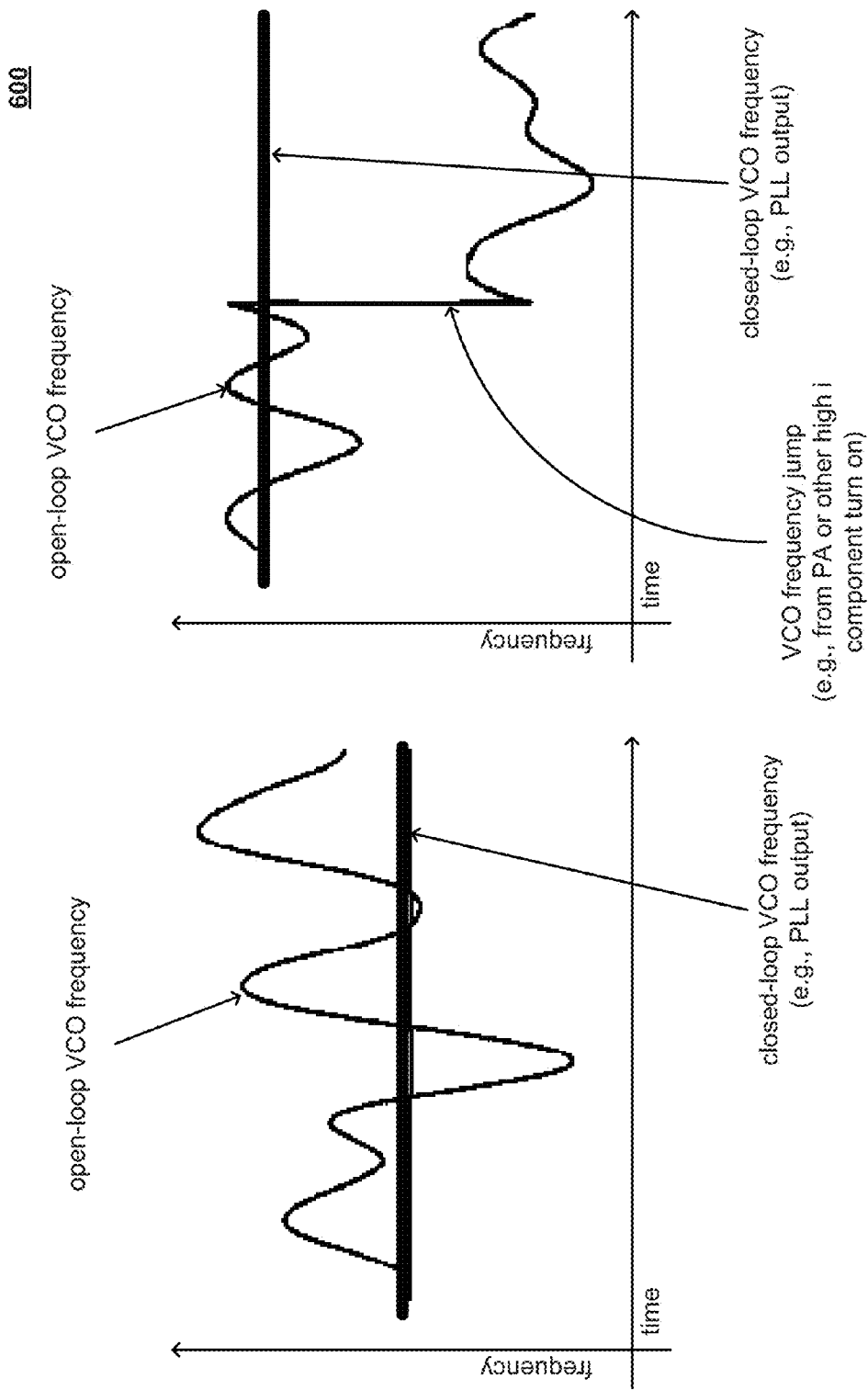
FIG. 6 illustrates an embodiment of at least one deleterious effect incurred by at least one component within one transceiver (or radio) based on turn on (or operation) of at least one component within another transceiver (or radio).

FIG. 6 illustrates an embodiment 600 of at least one deleterious effect incurred by at least one component within one transceiver (or radio) based on turn on (or operation) of at least one component within another transceiver (or radio). On the left hand side of this diagram, the open-loop VCO frequency and the closed-loop VCO frequency (e.g., a phase locked loop (PLL) output) within a radio of a wireless communication device are shown in the absence of a perturbation such as a frequency spike as may be caused by turn on of a PA in one of the radios within a wireless communication device.

On the right hand side of this diagram, the open-loop VCO frequency and the closed-loop VCO frequency (e.g., a PLL output) within a radio of a wireless communication device are shown with respect to a perturbation such as a frequency spike as may be caused by turn on of a PA (or other component) in one of the radios within a wireless communication device.

For example, with respect to PA activity in radio 2 (such as in a wireless communication device including a radio 1 and a radio 2) may lead to a large drift in VCO frequency in radio 1. Such frequency drift in radio 1 may be sudden and abrupt (e.g., more like a jump) in response to such a frequency spike as may be caused by turn on of a PA (or other component) in radio 2 within a wireless communication device.

In response to such a deleterious effect, a PLL in radio 2 may be implemented operative to compensate for the VCO drift. However, if the drift is too fast or abrupt (e.g., such as a jump), the PLL output clock will retain the VCO jump, and this can result in a frequency spike in the carrier.

Figure 7:
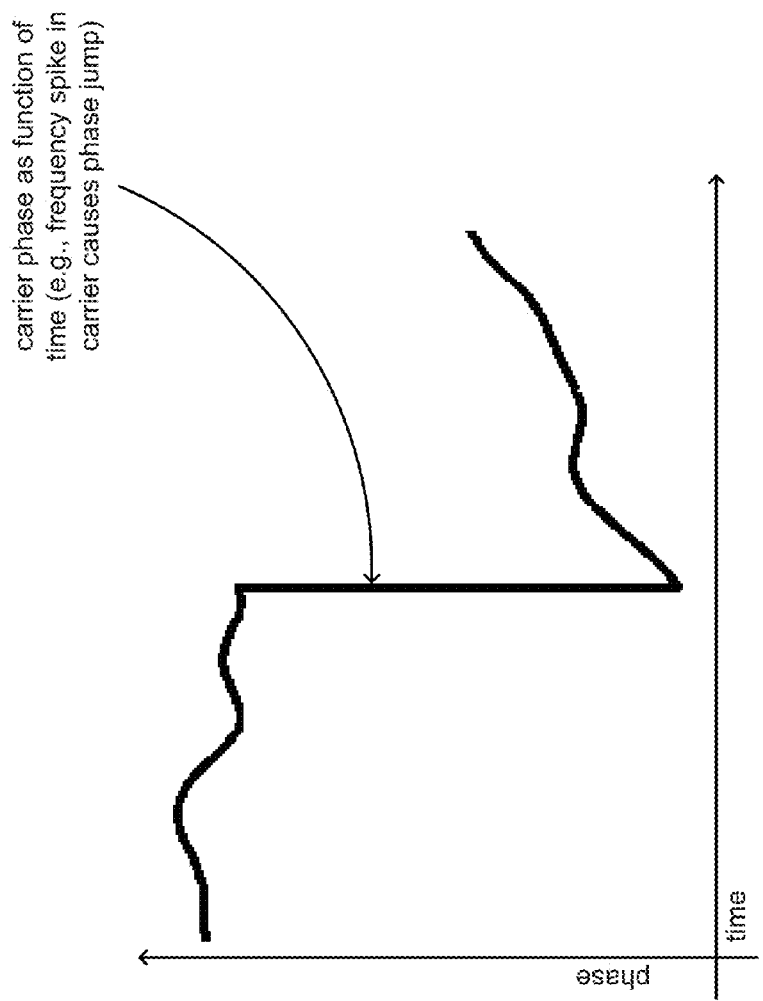
FIG. 7 illustrates an embodiment of deleterious effect of a frequency spike in operation of a wireless communication device.

FIG. 7 illustrates an embodiment 700 of deleterious effect of a frequency spike in operation of a wireless communication device. When the carrier has a frequency spike, the carrier phase may have an associated jump as depicted in this diagram. That is to say, there is a large phase jump associated with a frequency spike, and there are several impacts of this phase jump.

For example, if the phase jump happens in the middle of an orthogonal frequency division multiplexing (OFDM) symbol, there may be severe inter-carrier interference (ICI), leading to poor signal to noise ratio (SNR) on that particular OFDM symbol. Also, a given carrier phase compensation loop may not have sufficient bandwidth to track such large and abrupt jumps, leading to under-compensation of the phase. These phase problems can subsequently lead to decoding errors.

Certain novel means for operating two or more radios within a wireless communication device are presented herein.

In accordance with supporting simultaneous RX-TX in which a radio 1 within a wireless communication device is receiving a first communication (e.g., such as a first packet), the other radio 2 within the wireless communication device intends to initiate transmission of a second communication (e.g., a second packet), a PA (and/or other components) within radio 2 may be should be turned ON at the beginning of a guard interval (or other appropriately identified time or location) in the first packet is in the air (e.g., as being transmitted to this particular wireless communication device). The timing of these two operations should match in the air.

For example, the actual signal should be airborne (e.g., the first non-zero samples fed to a digital to analog converter (DAC)) at an appropriately identified location or time (e.g., such as the beginning of a next guard interval (GI), if such a restriction does not harm short inter-frame space (SIFS)

requirement). This appropriately identified location or time may alternatively be at any arbitrary time determined by SIFS requirement.

It is also noted that phase rotation of the symbol immediately following the PA turn-on may be very different from phase rotation of the previous symbol (e.g., the deleterious effect of a frequency spike can cause very different phase rotations of successive symbols within a communication). In such instances, appropriate carrier phase estimation (CPE) should be able to handle large phase jumps from one symbol to the next (e.g., among two successive orthogonal frequency division multiplexing (OFDM) symbols).

In accordance with supporting simultaneous TX-TX in which a radio 1 within a wireless communication device is transmitting a first communication (e.g., such as a first packet), the other radio 2 within the wireless communication device intends to initiate transmission of a second communication (e.g., a second packet), the PA (and/or other components) of radio 2 should be turned ON at the beginning of a guard interval in radio 1 (or other appropriately identified time or location) in the first packet as seen in the air. In this embodiment of supporting simultaneous TX-TX, it is noted that precise knowledge of the location of such a guard interval will be certainly known (e.g., because the transmission is from this particular wireless communication device). It is also noted that one or more parameters may be selected particularly for robustness (e.g., relatively lower code rate, relatively lower order modulation with relatively fewer constellation points, etc.) to effectuate the communications from radio 1. For example, if a media access control (MAC) within the wireless communication device can predict an impending transmission on radio 2, then a relatively more robust parameter (e.g., relatively lower code rate, relatively lower order modulation with relatively fewer constellation points, etc.) may be selected for the particular packet being transmitted by radio 1. Also, if desired in certain embodiments, a relatively more robust parameter (e.g., relatively lower code rate, relatively lower order modulation with relatively fewer constellation points, etc.) may be selected if radio 2 has any chance of initiating a transmission during a transmission being made by radio 1. In an embodiment in which the radio 1 is already transmitting, then relatively more robust parameter (e.g., relatively lower code rate, relatively lower order modulation with relatively fewer constellation points, etc.) may e selected for transmission in radio 2 as well.

For both of the cases (e.g., simultaneous RX-TX and simultaneous TX-TX), to minimize the deleterious effects that can impact components within another radio in the wireless communication device (such as the VCO), one or more operational parameters of components may be adjusted (if even only temporarily) during the time in which they may be so affected. For example, in an effort to minimize the impact of VCO pulling, the loop bandwidth in radio 1 may be increased temporarily so that the PLL output clock settles sufficiently quickly so as to minimize the impact thereof. This adjustment of the loop bandwidth of such a PLL can operate to minimize duration of the spike, or transient. After a certain time period has elapsed (e.g., after the PA or other component has fully turned on and is operational), the loop bandwidth of the PLL can be adjusted again to another setting (e.g., brought back to a default configuration) after the radio 2 starts transmitting. Of course, other adjustments of components in one radio may also be made in efforts to minimize such deleterious effects as may be seen by turn on or operation of components within another radio of the wireless communication device.

Figure 8:
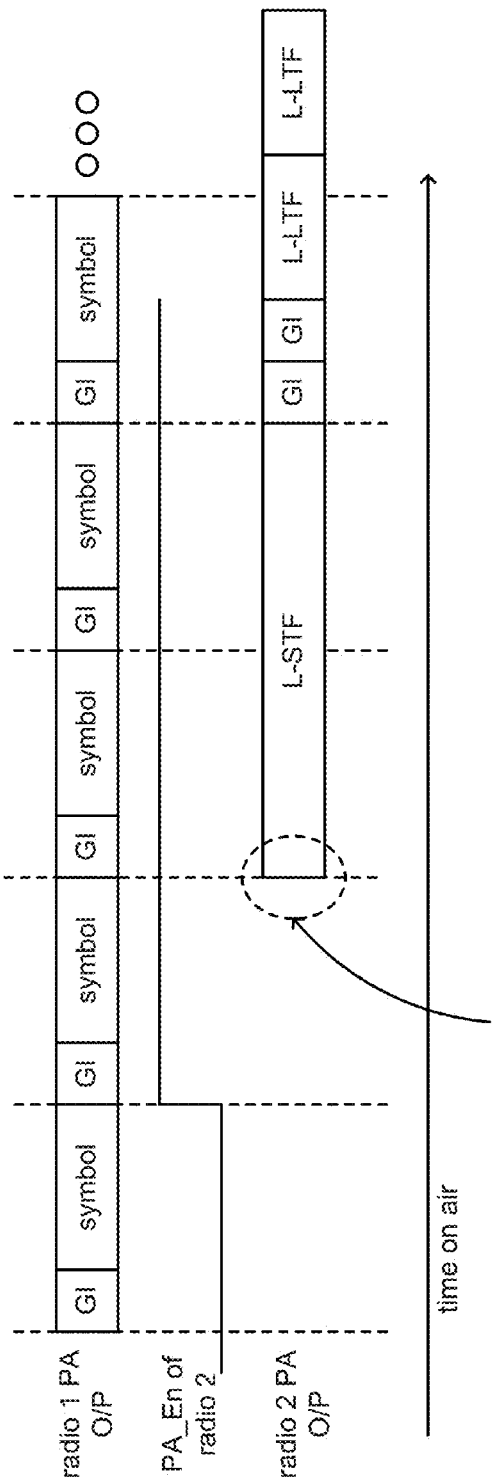
FIG. 8 illustrates an embodiment of simultaneous transmitting of respective signals using multiple transceivers (or radios).

FIG. 8 illustrates an embodiment 800 of simultaneous transmitting of respective signals using multiple transceivers (or radios). This embodiment related to a situation of simultaneous TX-TX as described elsewhere herein. As can be seen, the time of transmission in the radio 2 shown pictorially as being at the beginning of a guard interval (GI) of a transmission being made from radio 1. A given application can select another time (besides beginning of GI) at which to begin making the transmission from radio 2, and the selection of such a time (or location within the packet transmitted from radio 1) is made in a manner as to minimize the impact of the turn on or operation of components within radio 2 (e.g., a PA therein) as undesirably affecting operation of radio 1. For example, the time (or location within the packet transmitted from radio 1) is selected as the radio 1 being relatively less susceptible to the turn on or operation of components within radio 2.

Also, it is noted that any processing delays (e.g., latency) within the respective processing chains of a wireless communication device should also considered. For example, the latency through the baseband chain and radio transmitter (along any respective chains included in the wireless communication device) needs to be modeled accurately, and the latency should also be calibrated specifically to a given wireless communication device. In addition, if radio 2 has a chance of initiating transmission during transmission by radio 1, then at least one relatively more robust parameter (e.g., relatively lower code rate, relatively lower order modulation with relatively fewer constellation points, etc.) may be selected and employed for use by radio 1.

Figure 9:
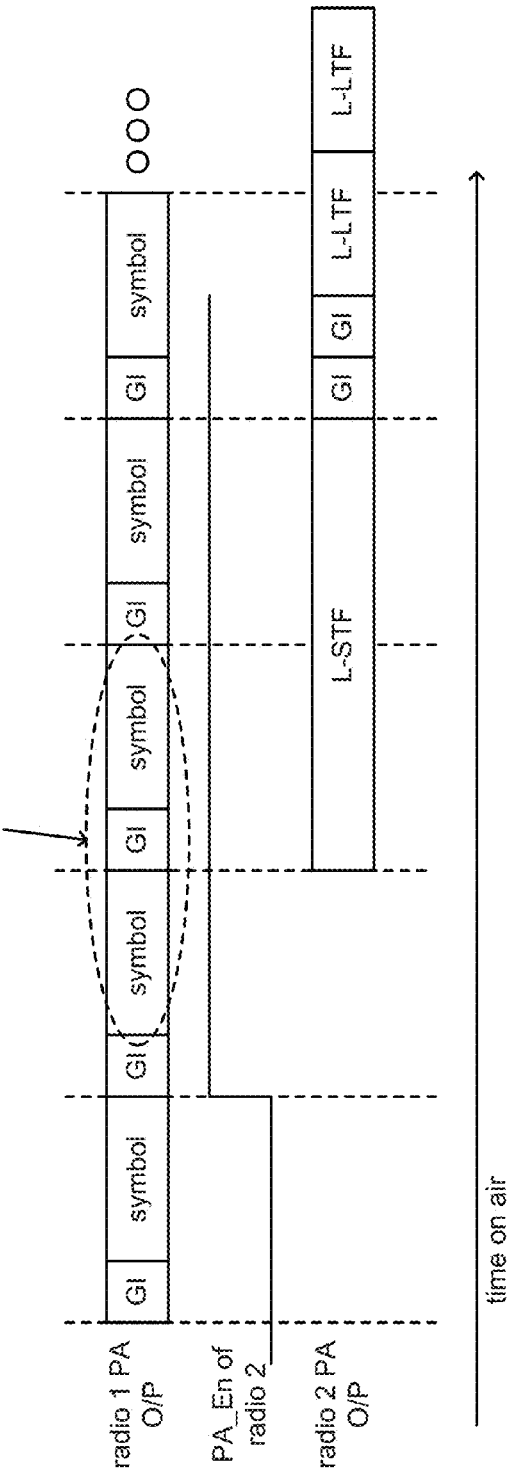
FIG. 9 illustrates an embodiment of simultaneous transmitting of a first signal while receiving a second signal using multiple transceivers (or radios).

FIG. 9 illustrates an embodiment 900 of simultaneous transmitting of a first signal while receiving a second signal using multiple transceivers (or radios). This embodiment related to a situation of simultaneous RX-TX as described elsewhere herein. This diagram has some similarities to the previous diagram. However, with respect to this embodiment, the wireless communication device (e.g., such as using a baseband processor therein) is operative to predict the location of next GI within the communication (e.g., packet) being received by radio 1. A transmission made from radio 2 can be made at a selected time (or location within the packet being received by radio 1) that will minimize the impact of the turn on or operation of components within radio 2 (e.g., a PA therein) as undesirably affecting operation of radio 1. As mentioned elsewhere herein, it is noted that successive symbols in a communication associated with radio 1 may be undesirably affected (e.g., have different phase rotation) as a result of the on or operation of components within radio 2 (e.g., a PA therein). As such, such affected symbols may undergo compensation for phase error there between. Such phase error compensation may be made during two successive symbols to handle any large phase jumps that may occur there between.

As also mentioned elsewhere herein, information related to any processing delays (e.g., latency) within the respective processing chains of a wireless communication device should also considered. For example, the latency through the baseband chain and radio transmitter (along any respective chains included in the wireless communication device) needs to be modeled accurately, and the latency should also be calibrated specifically to a given wireless communication device. For example, in this embodiment of simultaneous RX-TX, information related to such latency can be employed to predict the time (or location) of a next GI on the air (e.g., during its reception by radio 1).

FIG. 10 illustrates an embodiment 1000 of latency estimation within a wireless communication device. As can be seen, a test source feeds a transmitter of a receiver and a transmitter for which latency therein is being estimated. The output from the receiver is provided to a PA, the output of which is then looped back to the receiver. A power detector monitors the power of the PA, and after passing through an auxiliary analog to digital converter (ADC), is provided to a calibration circuitry.

In this embodiment, the transmitter (TX) latency calibration is based on power detector output going high. A test signal consists of multiple bursts, and the gap between two bursts should be larger than maximum expected latency. The use of multiple bursts allows for averaging the latency estimate.

In this embodiment, receiver (RX) latency calibration is based on pseudo-noise (P)N code matched filtering. The transmitter (TX) transmits a PN code modulated on a carrier, and the receiver (RX) is then tuned to the same channel using same carrier. It is noted that the PLL should be a shared PLL. The receiver (RX) then performs matched filtering on the received PN code to estimate latency. In accordance with such a calibration approach with reference to this diagram, latency may be measured within an accuracy of less than a nano-second ($1 \times 10^{-9}$).

Figure 11:
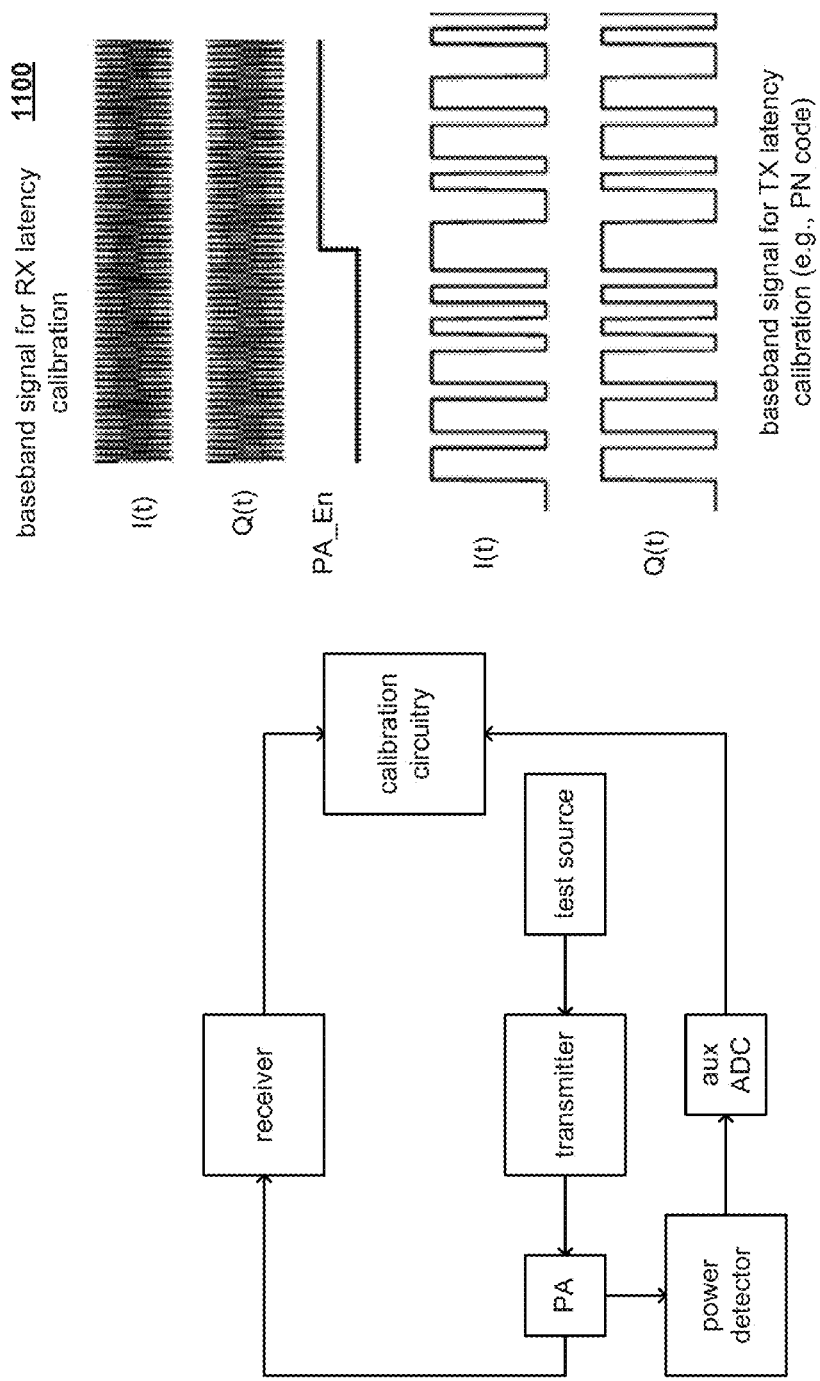
FIG. 11 illustrates an alternative embodiment of latency estimation within a wireless communication device.

FIG. 11 illustrates an alternative embodiment 1100 of latency estimation within a wireless communication device. In this embodiment, the receiver (RX) latency calibration is performed first. The transmitter (TX) is turned on and it starts transmitting, but the enable signal associated with the PA (PA_En) is set to zero. Then, PA_En is set to 1 at a particular instant, and receiver (RX) logic estimates the time instant when its starts receiving a high power signal in order to yields receiver latency.

In this embodiment, transmitter (TX) latency calibration is based on PN code matched filtering as described above with respect to another embodiment (e.g., FIG. 10). This yields both the transmitter and receiver (TX+RX) latency (i.e., the total latency). The receiver (RX) latency estimate from the operation described in the paragraph above may then be subtracted from the total latency to yield the transmitter (TX) latency.

The embodiments of these two diagrams, FIG. 10 and FIG. 11, show some possible options regarding the estimation of latency within respective transmitter and/or receiver portions of a wireless communication device. It is noted that, regardless of the manner in which latency is measured or estimated within a wireless communication device, such information can used to assist in the operation of simultaneous RX-TX and simultaneous TX-TX of a given wireless communication device.

As may be seen, the various aspects and principles, and their equivalents, of the invention are operative to provide for improved co-existence between two transceivers and radios (e.g., WLAN transceivers) on the same integrated circuit or chip. This can provide for improved reception on a first radio while a second radio is transmitting. Also, this can provide for improved inter-operability with another receiving wireless communication device (e.g., a $3^{rd}$ party wireless communication device) while transmitting.

It is also noted that the respective PAs of different radios within a wireless communication device may be physically emplaced relatively far away from one another within the device, but this alone may not guarantee sufficiently acceptable isolation from each other. Using various aspects and principles, and their equivalents, of the invention, such PAs of different radios within a wireless communication device may be physically emplaced relatively closer to one another while the wireless communication device still providing for acceptable performance and operation.

FIG. 12A, FIG. 12B, FIG. 13A, FIG. 13B, FIG. 14A, FIG. 14B, FIG. 15A, FIG. 15B, and FIG. 16 illustrate various embodiments 1200, 1201, 1300, 1301, 1400, 1401, 1500, 1501, and 1600, respectively, of methods for operating a wireless communication device.

Figure 12B:
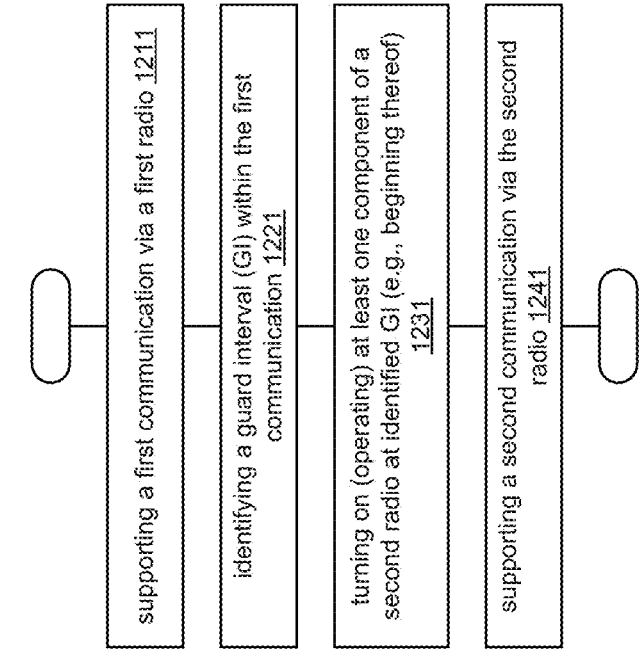
Figure 12A:
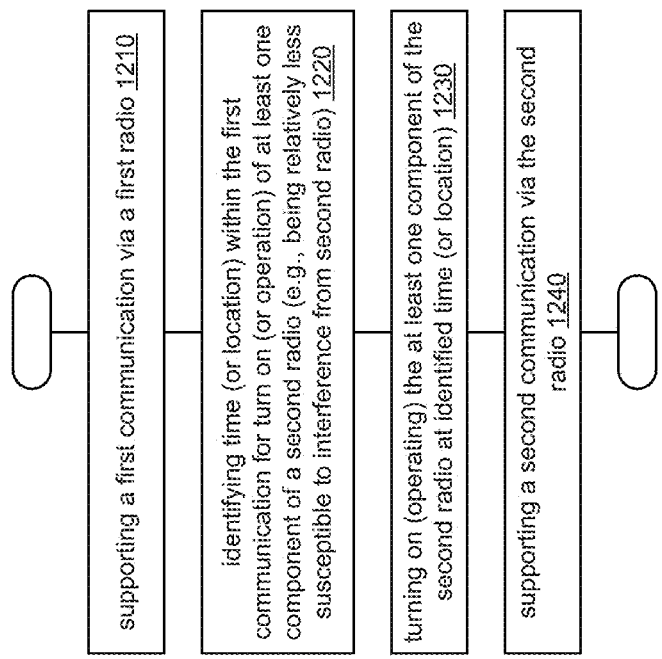

Referring to method 1200 of FIG. 12A, the method 1200 begins by supporting a first communication via a first radio, as shown in a block 1210. The method 1200 continues by identifying time (or location) within the first communication for turn on (or operation) of at least one component of a second radio (e.g., being relatively less susceptible to interference from second radio), as shown in a block 1220. That is to say, the selection of the time at which at least one component within the second radio (e.g., the PA) is turned on may be selected as to minimize any deleterious effects within the first radio. This may be beginning of a guard interval (GI) in one instance, or generally at any other time that may be selected in accordance with SIFS.

The method 1200 then operates by turning on (operating) the at least one component of the second radio at identified time (or location), as shown in a block 1230. The method 1200 continues by supporting a second communication via the second radio, as shown in a block 1240.

Referring to method 1201 of FIG. 12B, the method 1201 begins by supporting a first communication via a first radio, as shown in a block 1211. The method 1201 then operates by identifying a guard interval (GI) within the first communication, as shown in a block 1221. This diagram relates specifically to identifying a GI within the first communication.

The method 1201 continues by turning on (operating) at least one component of a second radio at identified GI (e.g., beginning thereof), as shown in a block 1231. The method 1201 then operates by supporting a second communication via the second radio, as shown in a block 1241.

Referring to method 1300 of FIG. 13A, the method 1300 begins by receiving a first communication via a first radio, as shown in a block 1310. The method 1300 continues by identifying a guard interval (GI) within the first communication, as shown in a block 1320. The method 1300 then operates by turning on (operating) at least one component of the second radio at identified GI (e.g., beginning thereof), as shown in a block 1330.

The method 1300 continues by transmitting a second communication via the second radio, as shown in a block 1340.

Referring to method 1301 of FIG. 13B, the method 1301 begins by transmitting a first communication via a first radio, as shown in a block 1311. The method 1301 then operates by turning on (operating) at least one component of a second radio at GI (e.g., beginning thereof) within first communication (known), as shown in a block 1321. The method 1301 continues by transmitting a second communication via the second radio, as shown in a block 1331.

Figure 14B:
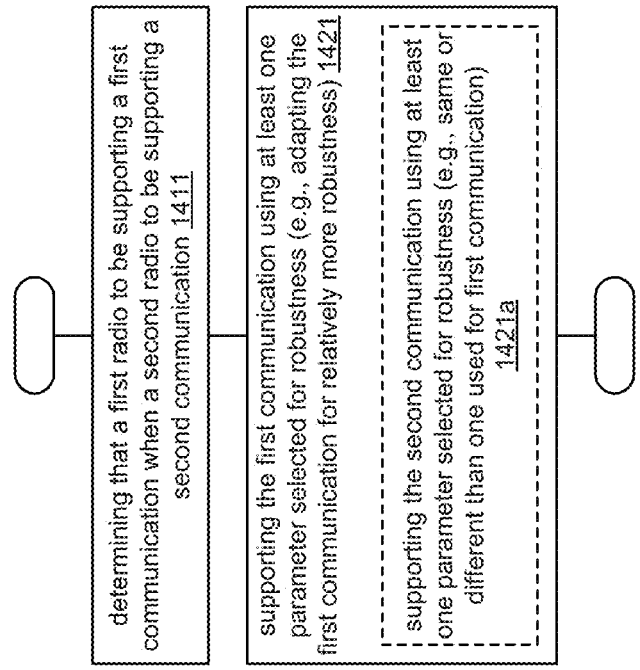
Figure 14A:
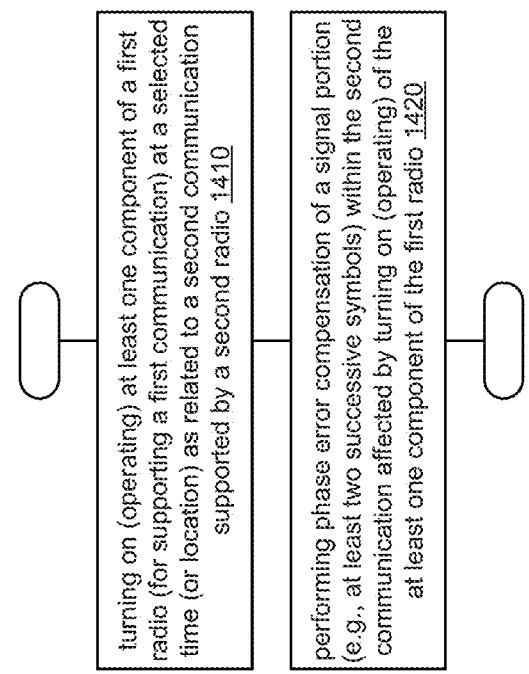

Referring to method 1400 of FIG. 14A, the method 1400 begins by turning on (operating) at least one component of a first radio (for supporting a first communication) at a selected time (or location) as related to a second communication supported by a second radio, as shown in a block 1410.

The method 1400 continues by performing phase error compensation of a signal portion (e.g., at least two successive symbols) within the second communication affected by turning on (operating) of the at least one component of the first radio, as shown in a block 1420.

Referring to method 1401 of FIG. 14B, the method 1401 begins by determining that a first radio to be supporting a first communication when a second radio to be supporting a second communication, as shown in a block 1411.

The method 1401 then operates by supporting the first communication using at least one parameter selected for robustness (e.g., adapting the first communication for relatively more robustness), as shown in a block 1421. In some embodiments, the operations of the block 1421 include supporting the second communication using at least one parameter selected for robustness (e.g., same or different than one used for first communication), as shown in a block 1421a.

Referring to method 1500 of FIG. 15A, the method 1500 begins by determining that a first radio is already supporting a first communication when a second radio to be supporting a second communication, as shown in a block 1510. The method 1500 continues by supporting the second communication using at least one parameter selected for robustness (e.g., relative to the first communication), as shown in a block 1520.

Referring to method 1501 of FIG. 15B, the method 1501 begins by performing first modification of a loop bandwidth of a phase locked loop (PLL) of a first radio (e.g., from a first or default configuration before turning on (operating) a second radio (for supporting a second communication), as shown in a block 1511.

The method 1501 then operates by performing second modification of the loop bandwidth of the PLL of the first radio after completion of turn on (operation) of the second radio (e.g., to a second configuration or returning loop bandwidth to the default configuration), as shown in a block 1521.

Referring to method 1600 of FIG. 16, the method 1600 begins by supporting a first communication via a first radio, as shown in a block 1610.

The method 1600 continues by identifying time (or location) within the first communication for turn on (or operation) of at least one component of a second radio based, at least in part, on latency of a first transceiver chain (e.g., first radio and first baseband chain) and/or latency of second transceiver chain (e.g., second radio and second baseband chain), as shown in a block 1620.

The method 1600 then operates by turning on (operating) the at least one component of the second radio at identified time (or location), as shown in a block 1630. The method 1600 continues by supporting a second communication via the second radio, as shown in a block 1640.

While many of the embodiments described herein relate to operate of wireless communication devices, it is of course noted that the various aspects and principles, and their equivalents, of the invention may also be extended to and applicable to communication devices operative in wired communication systems as well. That is to say, appropriate coordination and operation of the various communication processing chains (e.g., baseband and analog front end components) within a communication device operative to support communications via separate channels, bands, etc.

It is noted that the various modules and/or circuitries (e.g., encoding modules and/or circuitries, decoding modules and/or circuitries, processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |

TABLE 2-continued

Channelization for Table 1

| Channel | Frequency (MHz) |
|---|---|
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |

TABLE 3-continued

Power Spectral Density (PSD) Mask for Table 1
PSD Mask 1

| Frequency Offset | dBr |
|---|---|
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |

TABLE 5-continued

Channelization for Table 4

| Channel | Frequency (MHz) | Country | Channel | Frequency (MHz) | Country |
|---|---|---|---|---|---|
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
a communication interface; and
a processor, wherein the at least one of the processor or the communication interface includes a first radio configured to support first communications and a second radio configured to support second communications, and wherein the at least one of the processor or the communication interface configured to:
analyze the first communications that are supported using a first component of the first radio to predict a subsequent time period of the first communications during which to turn on a second component of the second radio configured to support the second communications for simultaneous support of the first communications and the second communications;
turn on the second component of the second radio to support the second communications during the subsequent time period and simultaneously support the first communications using the first component of the first radio and the second communications using the second component of the second radio; and
modify a loop bandwidth of a phase locked loop (PLL) of the first radio during turn on of the second component of the second radio.

2. The wireless communication device of claim 1, wherein the at least one of the processor or the communication interface is further configured to:
predict the subsequent time period during which to turn on the second component of the second radio configured to support the second communications for the simultaneous support of the first communications and the second communications based on the turn on of the second component of the second radio during the subsequent time period relatively deleteriously affecting the first communications less than during at least one other subsequent time period of the first communications.

3. The wireless communication device of claim 1, wherein the at least one of the processor or the communication interface is further configured to:
support the first communications via a first band; and
support the second communications via a second band that is different than the first band.

4. The wireless communication device of claim 1, wherein the communication interface and the processor are implemented as one or more integrated circuits.

5. The wireless communication device of claim 1 further comprising:
a cellular telephone, a two-way radio, a personal digital assistant (PDA), a personal computer (PC), a laptop computer, or a home entertainment equipment.

6. The wireless communication device of claim 1, wherein the at least one of the processor or the communication interface includes:
a first integrated circuit configured to support the first communications; and
a second integrated circuit configured to support the second communications.

7. The wireless communication device of claim 1, wherein the at least one of the processor or the communication interface is further configured to:
predict the subsequent time period as a guard interval within the first communications based on at least one other guard interval within the first communications; and
turn on the second component of the second radio at a beginning of the guard interval and simultaneously support the first communications using the first component of the first radio and the second communications using the second component of the second radio.

8. The wireless communication device of claim 1 further comprising:
an access point (AP) or a wireless station (STA) configured to operate within a wireless local area network (WLAN).

9. A wireless communication device comprising:
a first radio configured to support first communications;
a second radio configured to support second communications; and
a processor, at least one of the processor, the first radio, or the second radio configured to:
analyze first communications that are supported using the first radio to predict a subsequent time period of the first communications during which to turn on a component of the second radio for simultaneous support of the first communications and the second communications based on the turn on of the component of the second radio during the subsequent time period relatively deleteriously affecting the first communications less than during at least one other subsequent time period of the first communications;

turn on the component of the second radio to support the second communications during the subsequent time period and simultaneously support the first communications using the first radio and the second communications using the second radio; and modify a loop bandwidth of a phase locked loop (PLL) of the first radio during turn on of the component of the second radio.

10. The wireless communication device of claim 9 further comprising:
the first radio implemented within a first integrated circuit; and
the second radio implemented within a second integrated circuit.

11. The wireless communication device of claim 9 further comprising:
the first radio configured to support the first communications via a first band; and
the second radio configured to support the second communications via a second band that is different than the first band.

12. The wireless communication device of claim 9, wherein the at least one of the processor, the first radio, or the second radio is further configured to:
predict the subsequent time period as a guard interval within the first communications based on at least one other guard interval within the first communications; and
turn on another component of the second radio at a beginning of the guard interval and simultaneously support the first communications using the first radio and the second communications using the another component of the second radio.

13. The wireless communication device of claim 9 further comprising:
an access point (AP) or a wireless station (STA) configured to operate within a wireless local area network (WLAN).

14. A method for execution by a wireless communication device, the method comprising:
operating a first radio of a communication interface of the wireless communication device to support first communications;
operating a second first radio of the communication interface of the wireless communication device to support second communications;

analyzing the first communications that are supported using a first component of the first radio of the wireless communication device to predict a subsequent time period of the first communications during which to turn on a second component of the second radio configured to support the second communications for simultaneous support of the first communications and the second communications;

turning on the second component of the second radio to support the second communications during the subsequent time period and simultaneously supporting the first communications using the first component of the first radio and the second communications using the second component of the second radio; and modifying a loop bandwidth of a phase locked loop (PLL) of the first radio during turn on of the second component of the second radio.

15. The method of claim 14 further comprising:
predicting the subsequent time period during which to turn on the second component of the second radio configured to support the second communications for the simultaneous support of the first communications and the second communications based on the turn on of the second component of the second radio during the subsequent time period relatively deleteriously affecting the first communications less than during at least one other subsequent time period of the first communications.

16. The method of claim 14 further comprising:
supporting the first communications via a first band; and
supporting the second communications via a second band that is different than the first band.

17. The method of claim 14, wherein the communication interface is implemented as one or more integrated circuits.

18. The method of claim 14, wherein the wireless communication device includes a cellular telephone, a two-way radio, a personal digital assistant (PDA), a personal computer (PC), a laptop computer, or a home entertainment equipment.

19. The method of claim 14 further comprising:
predicting the subsequent time period as a guard interval within the first communications based on at least one other guard interval within the first communications; and
turning on the second component of the second radio at a beginning of the guard interval and simultaneously support the first communications using the first component of the first radio and the second communications using the second component of the second radio.

20. The method of claim 14, wherein the wireless communication device includes an access point (AP) or a wireless station (STA) configured to operate within a wireless local area network (WLAN).

* * * * *